US011821791B1

(12) United States Patent
Touahri et al.

(10) Patent No.: US 11,821,791 B1
(45) Date of Patent: Nov. 21, 2023

(54) TECHNIQUES FOR REDUCING OPTICAL GHOSTS IN A GRATINGS-BASED OPTICAL SPECTRUM ANALYZER (OSA)

(71) Applicant: VIAVI SOLUTIONS INC., Chandler, AZ (US)

(72) Inventors: Driss Touahri, Nepean (CA); Christopher Russell Wagner, Kanata (CA); Luis Andre Neves Paiva Fernandes, Maia (PT); Joshua Benjamin Julius Philipson, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/850,201

(22) Filed: Jun. 27, 2022

(51) Int. Cl.
*G01J 3/28* (2006.01)
*G01J 3/18* (2006.01)
*G01J 3/14* (2006.01)
*G01J 3/02* (2006.01)
G01J 3/12 (2006.01)

(52) U.S. Cl.
CPC ............... *G01J 3/28* (2013.01); *G01J 3/021* (2013.01); *G01J 3/0208* (2013.01); *G01J 3/14* (2013.01); *G01J 3/18* (2013.01); G01J 2003/1208 (2013.01)

(58) Field of Classification Search
CPC .. G01J 3/28; G01J 3/0208; G01J 3/021; G01J 3/14; G01J 3/18; G01J 2003/1208
See application file for complete search history.

(56) References Cited

U.S. PATENT DOCUMENTS

| 9,140,537 B2 * | 9/2015 | de Groot | G01D 5/266 |
| 2003/0063633 A1 * | 4/2003 | Zhang | H01S 5/143 372/20 |
| 2009/0154876 A1 * | 6/2009 | McLaughlin | G02B 6/29311 385/36 |
| 2009/0273840 A1 * | 11/2009 | McLaughlin | G02B 6/2931 359/569 |
| 2010/0230863 A1 * | 9/2010 | Moench | B29B 13/024 264/405 |
| 2013/0114061 A1 * | 5/2013 | de Groot | G03F 7/70775 355/72 |
| 2021/0055555 A1 * | 2/2021 | Chi | G02B 27/4205 |
| 2021/0373209 A1 * | 12/2021 | Hwang | G02B 5/136 |

* cited by examiner

*Primary Examiner* — Abdullahi Nur
(74) *Attorney, Agent, or Firm* — Mannava & Kang, P.C.

(57) ABSTRACT

A monochromator apparatus for an optical spectrum analyzer may include a diffraction grating, a rotatable oblique prism reflector element with a non-right-angle apex angle, and a mirror. An input optical beam received from an input component may be diffracted by the grating element and reflected by a reflector element, where the reflector element may include a rotatable oblique prism with an apex angle that is different from a right angle. A mirror may reflect the reflected diffracted optical beam back to the reflector element and the grating element. An output optical beam from the grating element may be provided via an output element to a detection element for high resolution optical measurement. The oblique prism reflector element may reduce or eliminate a Littrow ghost effect or secondary ghost effects caused by the grating element.

19 Claims, 12 Drawing Sheets

US 11,821,791 B1

TECHNIQUES FOR REDUCING OPTICAL GHOSTS IN A GRATINGS-BASED OPTICAL SPECTRUM ANALYZER (OSA)

TECHNICAL FIELD

This patent application is directed to optical measurement instrumentation, and more specifically, to a gratings-based optical spectrum analyzer (OSA) using an optical configuration for reducing or eliminating optical ghosts for improved resolution.

BACKGROUND

An optical spectrum analyzer extends the principles of spectrum analysis to the optical realm that are traditionally performed for the radio frequency (RF) spectrum by measuring important wavelength, power, and optical signal to noise ratio and other noise characteristics of light waves. Optical spectrum analyzers are often used in scientific research and for testing long haul, access networks, and data center interconnect fiber links with high channel counts, strict signal to noise requirements, and coherent technology enabling high speed transmission. For example, a fiber optic communication network utilizing wavelength division multiplexing (WDM) to allow multiple optical carrier signals to be carried over a single fiber is an application for the use of an optical spectrum analyzer.

There are many types of optical spectrum analyzers such are Fabry-Perot-based, interferometer-based and swept coherent heterodyne optical spectrum analyzers. However, the most common optical spectrum analyzers are diffraction grating based, known also as monochromator based optical spectrum analyzers. One challenge associated with grating-based optical spectrum analyzers is the presence of optical ghosts that are spurious spectral features generated at different spectral locations from the main signals. Eliminating spectral ghosts becomes even more challenging in compact optical spectrum analyzers.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
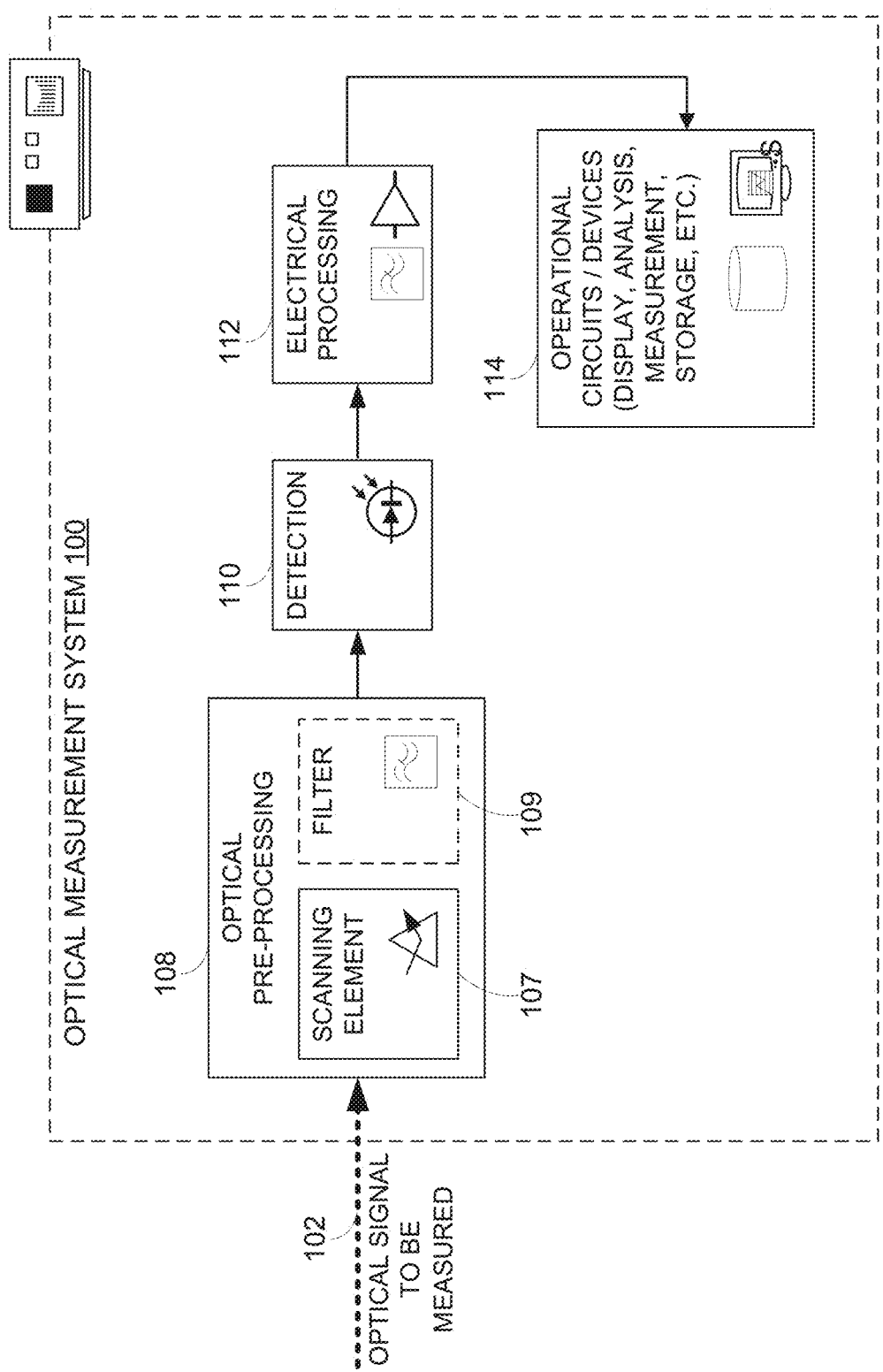
FIG. 1 illustrates a block diagram of an optical measurement system, such as an optical spectrum analyzer, which may include optical pre-processing with a diffraction grating monochromator as part of its front-end, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In a monochromator (diffraction grating) based optical spectrum analyzer, for example, a broadband light input signal may strike a diffraction grating. When this happens, a thin space between every two adjacent lines of the diffraction grating may become an independent "source," which may then diffract light off into a range of wavelet angles. For each wavelength and each specific angle, the diffracted wavelets may be generated at exactly one wavelength out of phase with one another, and may therefore add together constructively. In other words, light with a given wavelength may leave the diffraction grating at a specific angle. Also, the wider an illuminated portion of the diffraction grating, the higher the number of diffracted wavelets there may be, and therefore the narrower the diffracted beam pattern may become. This may enable a spectral resolution of the monochromator based optical spectrum analyzer to be proportional to the size of the illuminated portion of the diffraction grating.

As mentioned herein, diffraction grating-based optical spectrum analyzers may present optical ghosts that are spurious spectral features generated at different spectral locations from the main signals. Optical ghosts may propagate on a secondary path through the system that occurs at a different angle of the scanning element than the main signal. As a result, a copy of a spectral line may appear at a different spectral location that corresponds to that secondary scanning angle.

According to an example of the present disclosure, optical beams that cause Littrow ghost effect may be reduced or eliminated in grating-based optical spectrum analyzers by use of an oblique prism reflector element instead of a right-angle reflector. The ghost effect reduction or elimination may be achieved by using an oblique triangle prism reflector element. Having an apex angle of the prism (also referred to as "Porro prism") that is slightly different than 90 degrees may allow isolation of the Littrow ghost effect (or other ghost effects) in a separate plane than the plane of the main signal and direction of the ghost optical beam power away from the exit slit. The oblique prism-based ghost effect reduction or elimination may be achieved in any multi-pass configuration, where the main signal may be diffracted multiple times (e.g., two, four, etc.). In some examples, a mirror may be offset to direct the returning main signal to the exit slit. Furthermore, a focus element at the exit slit may be used to focus the main signal. In addition to the oblique prism, a flat mirror, or a mirror and lens combination may also be used as reflector element. For example, the mirror may be a convex mirror and the lens may be a focusing lens.

Some advantages and benefits of the systems and methods described herein are readily apparent. For example, a main signal path may be separated from ghost paths, which may be easily eliminated at the exit slit by means of a focusing element or similar. Stray light that is generated by multiple reflections from the prism reflector element may also be reduced. The reflections may be moved away from the main signal path within a shorter propagation length. Thus, a shorter propagation path may be achieved, and the unwanted reflections may still be removed from the exit slit. The shorter propagation path may allow for the components to be closer together, making the overall size smaller. Other benefits and advantages may also be apparent.

FIG. 1 illustrates a block diagram of an optical measurement system 100, such as an optical spectrum analyzer, which may include optical pre-processing with a diffraction grating monochromator as part of its front-end, according to an example. The optical measurement system 100 for example is a monochromator-based optical spectrum analyzer. The optical measurement system 100 may receive an optical input signal to be measured from an optical source 102, for example, a fiberoptic cable, and include an optical pre-processing block 108, a detection block 110, an electrical processing block 112, and operational circuits and devices 114. The optical pre-processing block 108 may include a scanning element 107 and one or more filters 109.

In an operation, the optical input signal to be measured may be pre-processed at the optical pre-processing block 108 and provided to the detection block 110, which may include, for example, a photodiode. The detection block 110 may provide an electrical signal derived from the optical input signal to be measured to the electrical processing block 112, where the electrical signal may be amplified, filtered, up- or down-converted, converted to a digital signal, or similarly processed. The output of the electrical processing block 112 may be provided to the operational circuits and devices 114, which may include a display driver, a storage device, a digital signal processor, and other comparable circuits and devices.

In pre-processing the optical input signal, the optical measurement system 100 may select individual wavelengths for measurement. Various techniques may be used to a wavelength for measurement. One example is a diffraction grating monochromator. To determine the power for an individual wavelength, the diffraction grating method may utilize a rotating filter or "grating" inside the optical spectrum analyzer (optical measurement system 100). Different wavelengths may be presented to a photodetector sequentially as the grating rotates. In such systems, a motor may drive the diffraction grating. For any given angle of the rotating grating, a small band of the input spectrum may be aligned with an output slit, which may be composed of an optical fiber that serves as an output coupler. In some examples, the output fiber may guide an output optical beam into a detection system (e.g., photodetector system), which may be composed of various opto-electrical elements, such as photodiodes, amplifiers, and/or analog-to-digital converters (ADCs). The detection system, among other things, may measure power as function of reflector angle, which in turn may correspond to a function of wavelength. This method is known for accommodating a wide spectral range and producing accurate readings.

As mentioned herein, optical ghosts, spurious spectral features that are generated at different spectral locations from the main signals, may be created at the scanning element 107, which may include a grating, a reflector element, and optionally a mirror (in case of multi-pass monochromators). To avoid detection of the optical ghost along with the main signal, a modified reflector element may be used. A modified reflector element may include an oblique prism (as opposed to a right-angle prism) or a flat mirror with adjustable angle. The modified reflector element may move an angle of the optical ghost causing the ghost to not return to the output element (exit slit), and thereby not be detected.

In some examples, the optical measurement system 100 may be a Fabry-Perot-based OSA, an interferometer-based OSA, a swept coherent heterodyne OSA, or comparable measurement system. It should be appreciated that the block diagram of the optical measurement system 100 in FIG. 1 is a block diagram showing major components of the optical measurement system 100. A measurement or similar test/monitoring system may be implemented with additional of fewer components, where certain functionality may be distributed among various components and sub-systems or performed by additional components or sub-systems using the principles described herein.

Figure 2A:
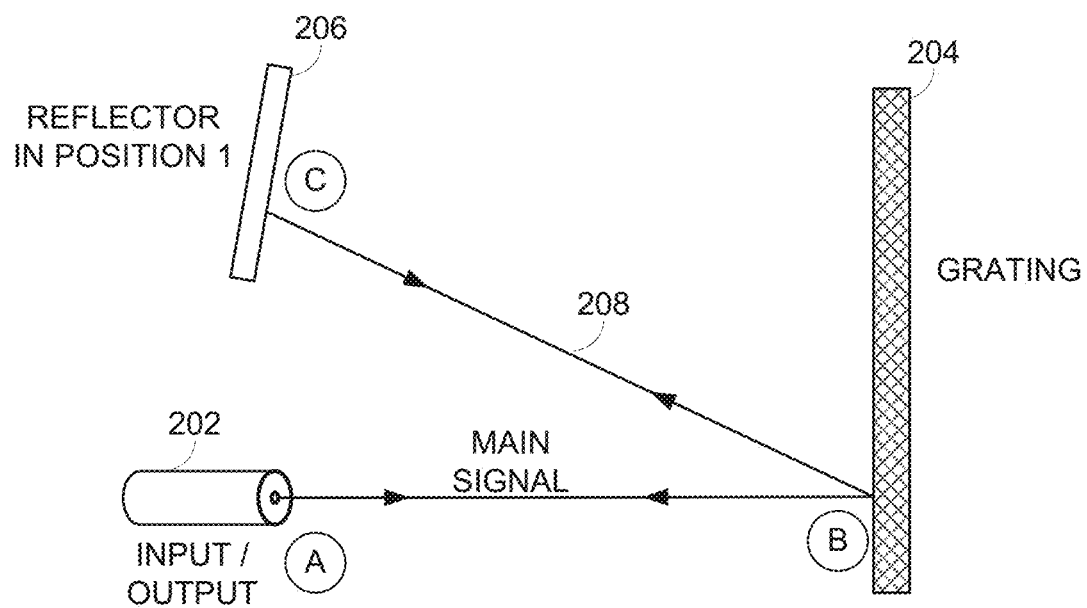
FIG. 2A illustrates example paths of a main signal in a dual-pass diffraction grating-based optical pre-processing system, according to an example.

FIG. 2A illustrates example paths of a main signal 208 in a dual-pass diffraction grating-based optical pre-processing system, according to an example. As shown in diagram 200A, an optical signal (main signal 208) with multiple wavelengths (e.g., a broadband beam) may be provided by an input/output element 202 onto a grating 204. The input/output element 202 may be any component that provides an optical signal (beam) onto the grating 204 and receives diffracted (and reflected) signal back. In practical implementations, the input/output element 202 may be two distinct components (e.g., an entrance slit and an exit slit). For simplicity purposes, the input and output elements are shown here as a single input/output element 202.

In some examples, the main signal 208 passing through the input/output element 202 may be provided by the optical source 102 in FIG. 1. The grating 204 may diffract the main signal 208 and provide one or more beams to a retroreflective element (reflector element 206), which may reflect the beam(s) back to the grating 204, from where further diffracted beam(s) may be provided to the output element or exit slit. The reflector element 206 may be implemented in a variety of ways, for example, using a right-angle prism, a flat mirror, a set of prisms, a set of mirrors, etc. In some examples, one or both of the grating 204 and the reflector element 206 may be rotatable.

In an operation, the main signal 208 may follow an initial path from point "A" at the input or entrance slit to point "B" on a surface of the grating 204. The diffracted main signal 208 may then follow from point "B" to point "C" on a surface of the reflector element 206, which may be in a first position. The first position of the reflector element 206 may be selected to correspond to a diffraction characteristic of the grating 204 such that the main signal 208 reflected by the reflector element 206 may follow the path from point "C" back to point "B". The main signal 208 may be diffracted for a second time (hence, "dual-pass") on the surface of the grating 204 and directed along the same path from point "B" to point "A" arriving at the input/output element 202.

It should be appreciated that one or more additional optical elements may also be provided. For example, a light source (not shown) may be provided upstream of the input or entrance slit to generate the main signal 208 (e.g., a broadband beam, white light, etc.). A detection system (not shown) may also be provided downstream of the output element or exit slit to collect and measure the diffracted main signal 208. Other optical elements may also be provided. For example, one or more collimators or lenses may be provided between entrance/exit slit and the grating 204 to collimate or focus the main signal 208 as needed.

In some examples, the grating 204 may be a diffraction grating. As such, the diffraction grating may be an optical component with a periodic structure of diffractive elements that split or diffract light into separate beams, which may be transmitted as diffracted signals and travel in different directions. In some examples, the diffraction grating may be a ruled, holographic, or other similar diffraction grating. The grating 204 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating 204 may also be made from a variety of materials. This may include any number of isotropic materials. In some examples, the grating 204 to be used in optical measurement system 100 may be selected based on any number of factors to optimize a resolution of the OSA. This may include factors, such as efficiency, blaze wavelength, wavelength range, stray light, resolving power, etc.

The reflector element 206 may include any number of configurations to provide retroreflection or other similar function. For example, the reflector element 206 may be a prism reflector element, a flat mirror, or a mirror and lens combination. In some examples, the mirror may be a convex mirror and the lens may be a focusing lens. It should be appreciated that other reflectors, configurations, or combinations of such elements or configurations, may also be provided.

As shown in the diagram 200A, the main signal 208 may travel from optical element to optical element. In this case, the main signal 208 may pass through the same grating 204 two times between the input component or entrance slit and the output element or exit slit, the multi-pass monochromator based optical spectrum analyzer of optical measurement system 100 may be referred to as a dual-pass (2-pass) monochromator based optical spectrum analyzer that is able, by design, to achieve high resolution optical measurements. In some example, additional retroreflective elements (e.g., mirrors) may be used for a four-pass (4-pass) or higher order optical spectrum analyzer.

Figure 2B:
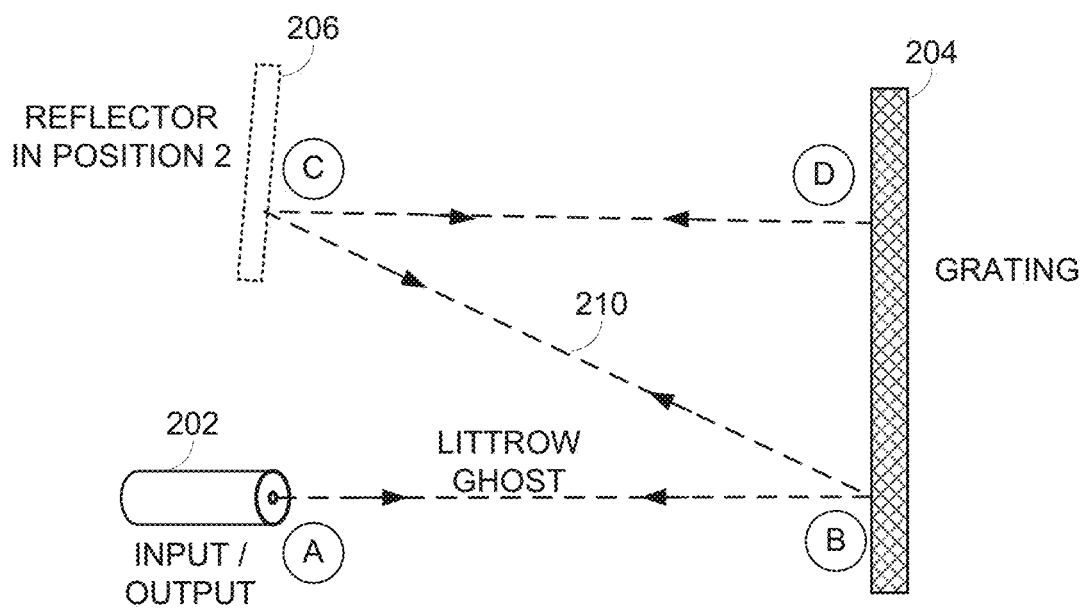
FIGS. 2B-2C illustrate paths of Littrow and secondary optical ghosts that may be generated in a diffraction grating-based optical pre-processing system, according to an example.
Figure 2C:
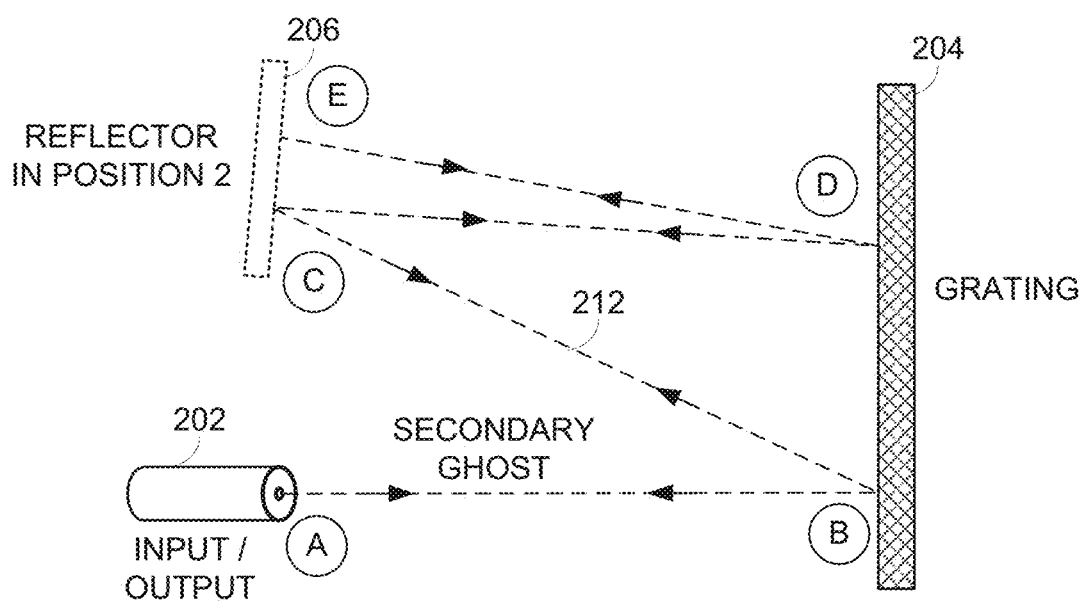

FIGS. 2B-2C illustrate paths of Littrow and secondary optical ghosts that may be generated in a diffraction grating-based optical pre-processing system, according to an example. As shown in diagram 200B of FIG. 2B, a Littrow ghost 210 may be created by a diffraction of the main signal being reflected by the reflector element 206 (in a second position different from the first position) back to the grating 204, getting diffracted back to the reflector element 206 along the same path, and then following the path as the main signal to the input/output element 202.

In some examples, depending on a wavelength range of the optical spectrum analyzer and an aperture of the optical elements used in the system, there may exist a multitude of additional paths that can generate optical ghosts. For a given grating order, the spectral location of the optical ghosts with respect to the main signal may depend on the diffraction grating groove density as well as on the incidence angle. There may be two types of optical ghosts: Littrow ghosts and non-Littrow ghosts.

Figure 3:
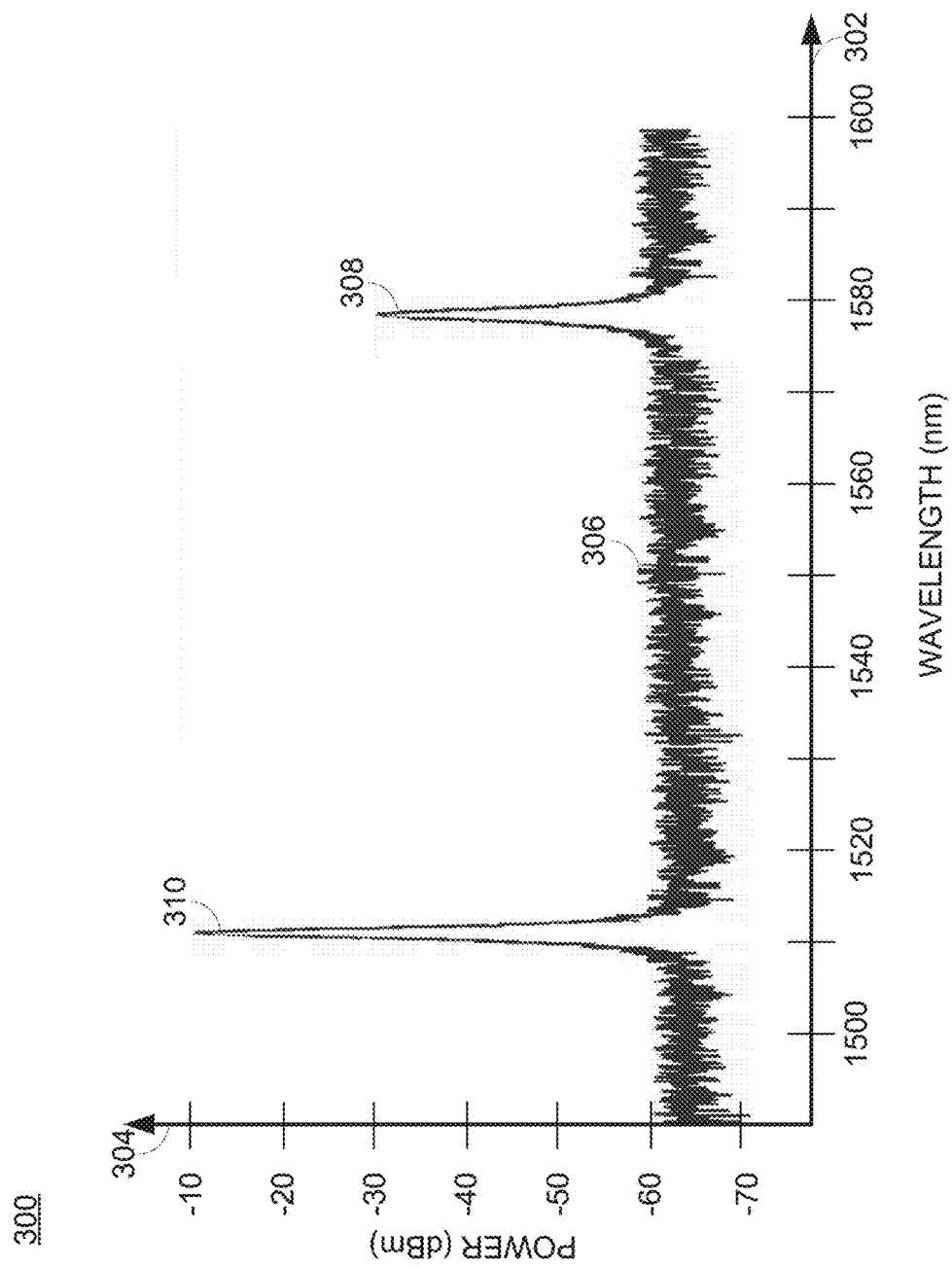
FIG. 3 illustrates an optical spectrum analyzer screenshot showing the main signal and an optical ghost, according to an example.

As shown in FIG. 2A, the main signal may follow a normal path where it is diffracted by the grating 204 towards the reflector element 206 (in first position), which then retro-reflects the main signal 208 back at normal incidence. However, when the reflector element 206 is rotated (second position) as shown in FIG. 2B, the beam as diffracted from the grating 204 is no longer normal to the reflector element 206 and is then reflected away from the path of the signal between points "C" and "D". There may be a specific reflector element orientation which orients the beam from point "C" exactly at the Littrow angle of the diffraction grating. As a result, the beam at point "D" may be "retro-diffracted" back to the reflector element 206. This may cause this beam (Littrow ghost 210) to be colinear with the main signal 208 towards the exit slit. Because the reflector angle for this Littrow ghost 210 is different than that of the main signal 208, the Littrow ghost 210 may appear as a spectral copy of the main signal 208 but at a different wavelength as shown in FIG. 3. The Littrow ghosts spectral location may depend on the grating groove density, the angle of incidence, and the wavelength. The spectral location may be mapped across the entire wavelength range using a grating equation for the grating 204.

Diagram 200C in FIG. 2C shows a secondary ghost 212 that may be generated through multiple passes between the reflector element 206 (in second position) and the grating 204 and follow the same path as the main signal 208 to the exit slit. Non-Littrow ghosts may be found in wideband optical spectrum analyzers, where the diffraction grating is static. In such static grating spectrum analyzers, the scanning mechanism may often be achieved by a rotating mirror or prism. In such a configuration, secondary ghosts, not specific to a Littrow configuration, may be generated.

As shown in FIG. 2A, the main signal 208 follows the path from point "A" to "B" to "C" and back to the output element or exit slit. Differently from the main signal, the secondary ghost 212 may be reflected to point "E" on the reflector element 206 (in second position) from point "D" on the grating 204 and be reflected back to the grating following the same path back ("D" to "C" to "B" to "A"). Thus, while the main signal goes through two passes on the grating, the secondary ghost 212 may go through four passes and arrive at the exit slit colinear with the main signal 208.

Figure 2D:
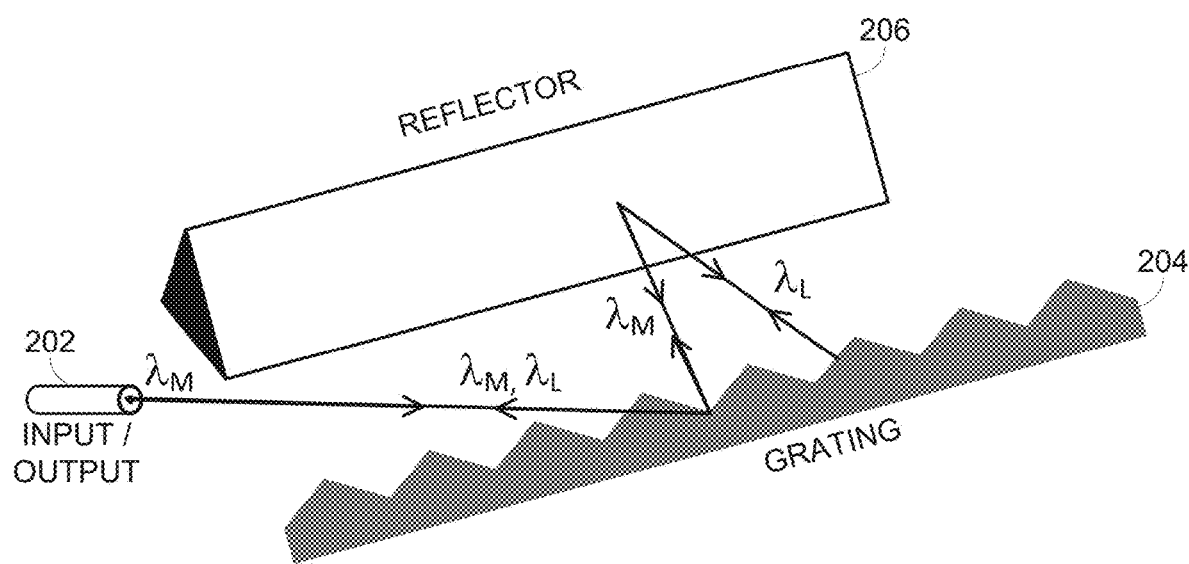
FIG. 2D illustrates paths of the main signal and the optical signal due to Littrow ghost effect in a diffraction grating-based optical pre-processing system, according to an example.

FIG. 2D illustrates paths of the main signal and the optical signal due to Littrow ghost effect in a diffraction grating-based optical pre-processing system, according to an example. Diagram 200D shows a main signal $\lambda_M$ being provided to the grating 204 from input/output element 202, diffracted toward the reflector element 206, and being reflected and diffracted again on the same path back to the output element or exit slit. As the reflector element 206 is rotated, a Littrow ghost $\lambda_L$ may be reflected toward the grating 204 from the reflector element 206, diffracted back to the reflector element 206, and follow the same path as the main signal $\lambda_M$ to the exit slit.

The grating 204 may be an optical component with a periodic structure that separates (disperses) polychromatic light into its constituent wavelengths (colors), in other words, splits or diffracts light into separate beams that may also travel in different directions. The dispersion may arise from wavefront division and interference of incident beam from a periodic structure of the grating. The grating 204 may include equally spaced parallel grooves, formed on a reflective coating and deposited on a substrate. A shape of the grooves (i.e., blaze angle) may influence which wavelength range the grating may be optimized for. In some examples, the grating 204 may be a ruled, holographic, or other similar diffraction grating. The grating 204 may also be configured, among other things, with various properties that include transparency (transmission amplitude diffraction grating), reflectance (reflection amplitude diffraction grating), refractive index or optical path length (phase diffraction grating), and/or direction of optical axis (optical axis diffraction grating). The grating 204 may be made from a variety of materials such as any number of isotropic materials.

After an incident light beam (wave) interacts with the grating 204, the resulting diffracted light from the grating 204 may include a sum of interfering wave components emanating from each groove in the grating. At any given point in space through which the diffracted light may pass (observation point), a path length from each groove in the grating 204 may vary. Thus, a phase of the wave emanating from each of the grooves at that point may also vary. For light at a normal incidence to the grating 204, intensity maxima may occur at diffraction angles $\theta_m$, which may satisfy the expression:

$$d*\sin\theta_m = m\lambda, \quad (1)$$

where $\theta_m$ is the angle between the diffracted beam and the diffraction grating's normal vector, $\lambda$ is the wavelength, d is a distance from the center of one groove to the center of another adjacent groove (i.e., periodicity distance), and m is an integer representing the propagation-mode of interest called the diffraction order.

For the incident beam (e.g., $\lambda_M$), the with an incidence angle $\theta_i$ (the angle between the incident beam and the grating's normal vector), the expression (1) may be provided as:

$$\sin\theta_i + \sin\theta_m = m\lambda/d. \quad (2)$$

Thus, for $0^{th}$ order (m=0), the diffraction grating may behave like a wavelength independent mirror, where $\theta_i = \theta_m$.

Again, this derivation of the grating equation may be based on an idealized grating element. However, the relationship between angles of the diffracted beams, grating spacing, and/or wavelength of the light may apply to any regular structure of the same spacing because phase relationship between light scattered from adjacent elements of the grating may generally remain the same. The detailed distribution of diffracted light may therefore depend on a detailed structure of the grating element(s) as well as on the number of elements in the grating structure, but it may typically provide maxima in the directions given by the grating equation.

According to the grating equation, and for every signal (e.g., main signal $\lambda_M$), there may be a wavelength, called Littrow ($\lambda_L$) that may be between 120 nm and 200 nm below $\lambda_M$, and that may strike the grating in an optical path, as shown in the FIG. 2D. FIG. 2D illustrates an optical path in a Littrow configuration for light between a reflector element and a grating. In other words, these optical signals may be diffracted back along their incident path, as shown in the optical path configuration FIG. 2D. Because a dual-pass monochromator based optical spectrum analyzer typically uses a 90-degree (right angle) prism reflector element, Littrow ghost may be a natural but undesirable result.

It should be appreciated that the diffraction grating based monochromator and reflector element discussed herein may be implemented with various configurations using fewer or additional elements implementing the principles described herein. The configurations shown in diagrams 200A-200D are intended as illustrative examples.

FIG. 3 illustrates an optical spectrum analyzer screenshot 300 showing the main signal 310 and an optical ghost 308, according to an example. Screenshot 300 shows across wavelength axis 302 (nm) and power axis 304 (dBm), a captured signal that includes noise 306 and two peaks: main signal 310, optical ghost 308.

As mentioned herein, the optical ghosts spectral location may depend on the grating groove density, the angle of incidence, and the wavelength. The spectral location may be mapped across the entire wavelength range using a grating equation for the grating. Depending on the same parameters, an amplitude of the optical ghost 308 may also be higher or lower than the illustrated example.

A challenge in controlling these spurious reflections may be exacerbated when the optical components are closer together in a compact/smaller form factor optical spectrum analyzer. An oblique prism reflector element as described in FIGS. 4A-4D may move these reflections away from the main optical path within a shorter propagation length.

Figure 4A:
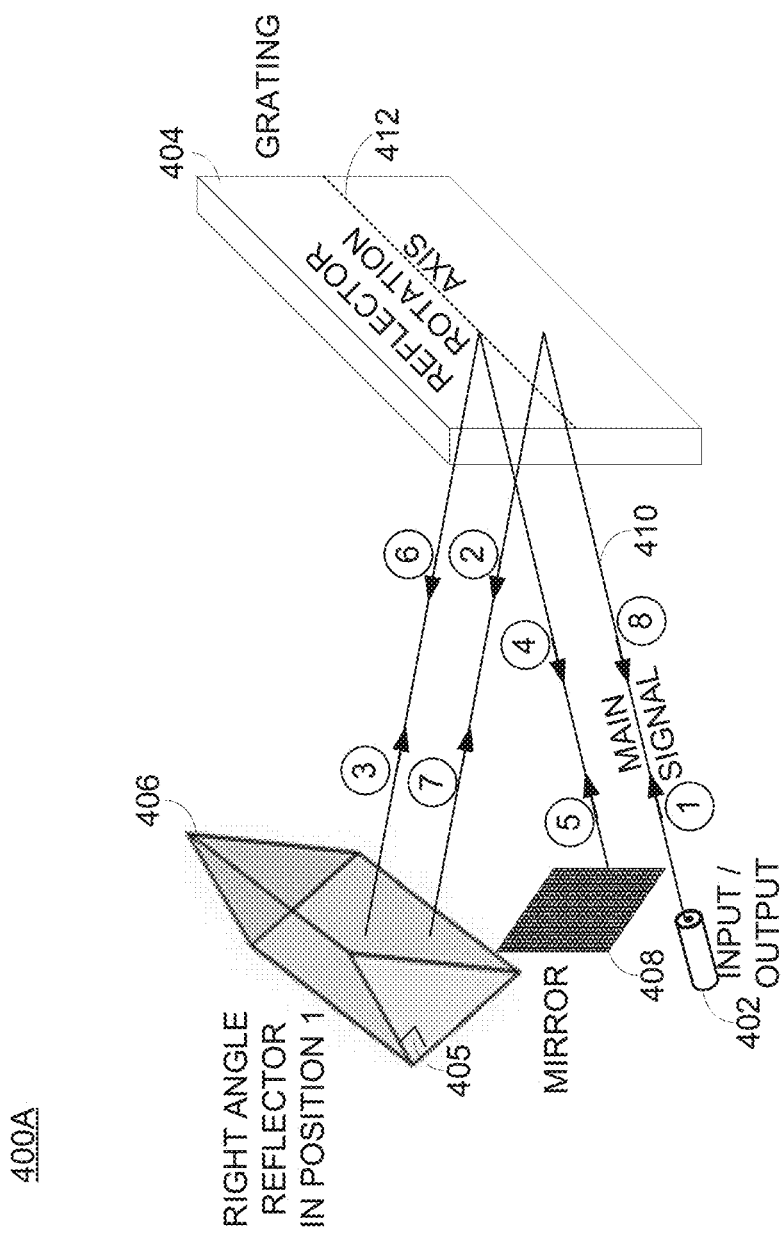
FIG. 4A-4B illustrate paths of the main signal and the optical signal due to Littrow ghost effect in a four-pass diffraction grating-based optical pre-processing system that uses a right-angle prism reflector element, according to an example.
Figure 4B:
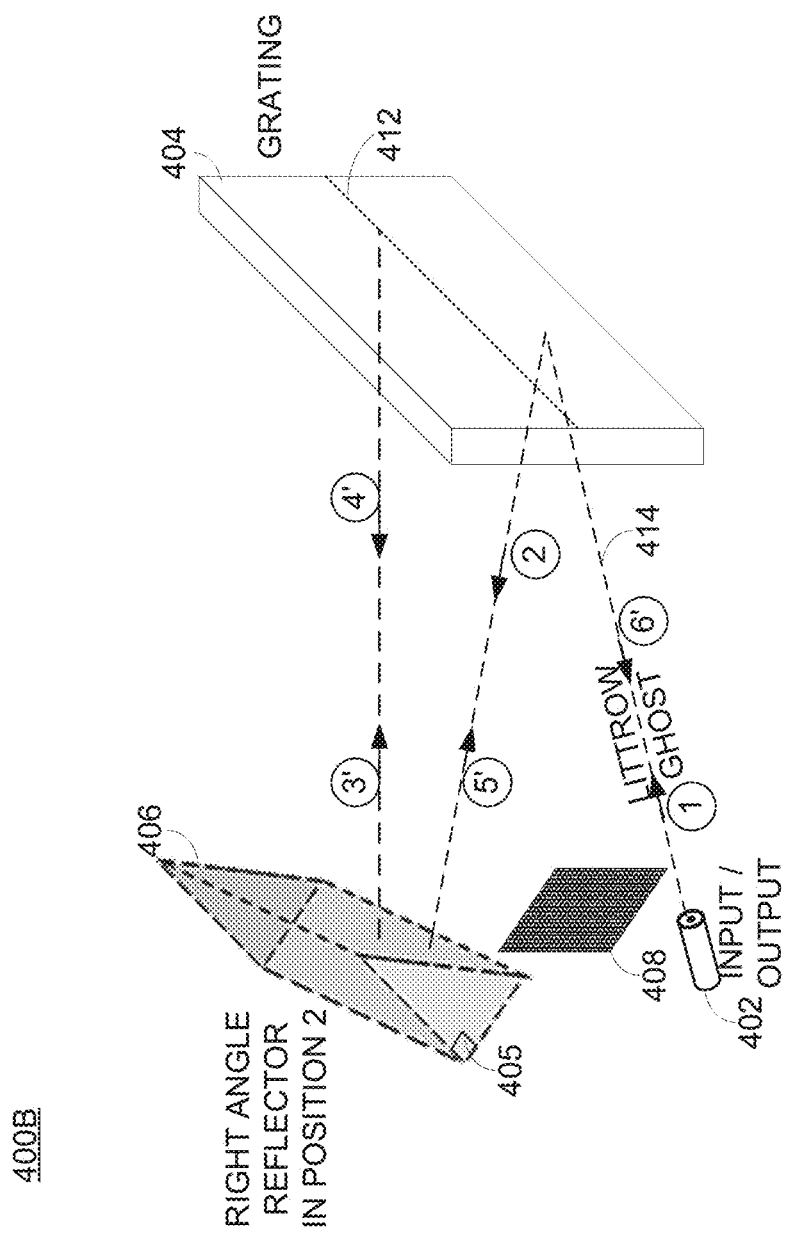

FIG. 4A-4B illustrate paths of the main signal 410 and the optical signal 414 due to Littrow ghost effect in a four-pass diffraction grating-based optical pre-processing system that uses a right-angle prism reflector element, according to an example. Diagram 400A shows a main signal 410 being transmitted from input/output element 402, which is shown as a single component also acting as entrance or exit slit for simplicity purposes. The main signal 410 is diffracted by a grating 404 toward a reflector element 406, which is a right-angle (405) prism, reflected back to the grating 404, and diffracted for the second time toward a mirror 408. The main signal 410 is then reflected back to the grating 404, diffracted for the third time toward the reflector element 406, reflected back from the reflector element 406, and diffracted for the fourth time ("four-pass") toward the input/output element 402. Thus, the main signal 410 follows the path (1), (2), (3). (4), (5). (6), (7), (8) shown on the diagram.

Diagram 400B shows the path of the optical signal 414 due to Littrow ghost effect. The Littrow ghost effect is created when the main signal being transmitted from input/output element 402 and diffracted and reflected at different angles in a second position of the right-angle (405) reflector element 406 but returns back to the input/output element 402 colinear with the main signal. The optical signal 414 is diffracted by the grating 404 toward the reflector element 406, then reflected back to the grating 404, and diffracted for the fourth time toward the input/output element 402. Thus, the optical signal 414 follows the path (1), (2), (3'), (4'), (5'), and (6') shown on the diagram. The paths followed by the optical beam(s) due to Littrow ghost effect start with path 1 (input element to the grating). However, the remainder of the paths (2, 3', 4', 5', and 6') are distinct from the paths of the main signal (2, 3, 4, 5, 6, 7, 8). The return path (6') of the optical beam due to Littrow effect may happen to be colinear with the return path (8) of the main signal due to grating characteristics and prism rotation angle. Differently from the main signal's path, the optical signal 414 due to Littrow ghost effect does not get reflected by the mirror 408.

Accordingly, in grating based optical spectrum analyzers with a right-angle prism reflector element, as the reflector element rotates, the reflected beam follows the straight line on the grating that is perpendicular to the reflector element rotation axis, shown as the dashed line 412 on FIGS. 4A and 4B. As a result, the outgoing beam in both cases, both the main signal as (illustrated in diagram 400A) and the optical ghost (Littrow ghost illustrated in diagram 400B) will be colinear to each other as they propagate towards the exit slit. This result may also hold for the case of a mirror reflector element used at normal incidence.

Figure 4C:
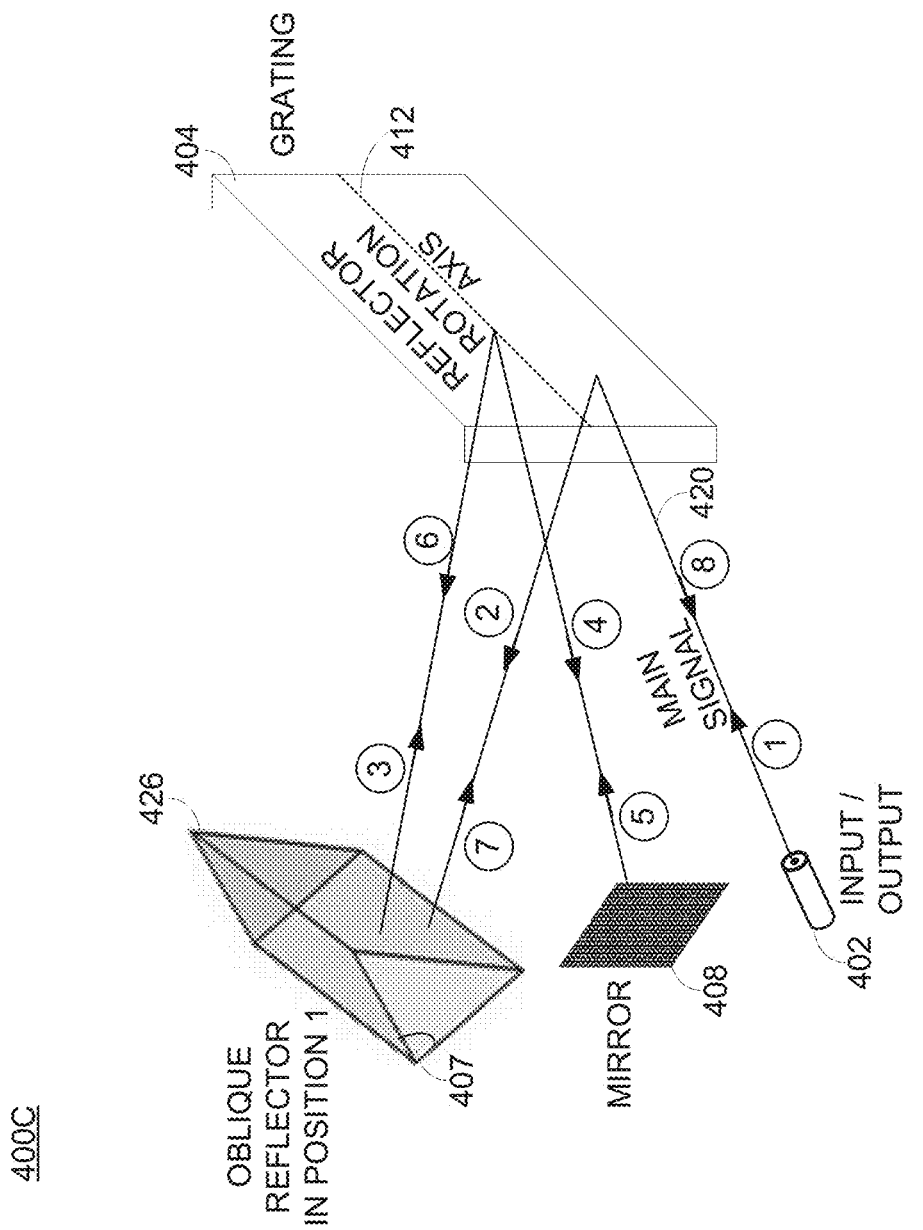
FIG. 4C-4D illustrate paths of the main signal and the optical signal due to Littrow ghost effect in a four-pass diffraction grating-based optical pre-processing system that uses an oblique prism reflector element, according to an example.
Figure 4D:
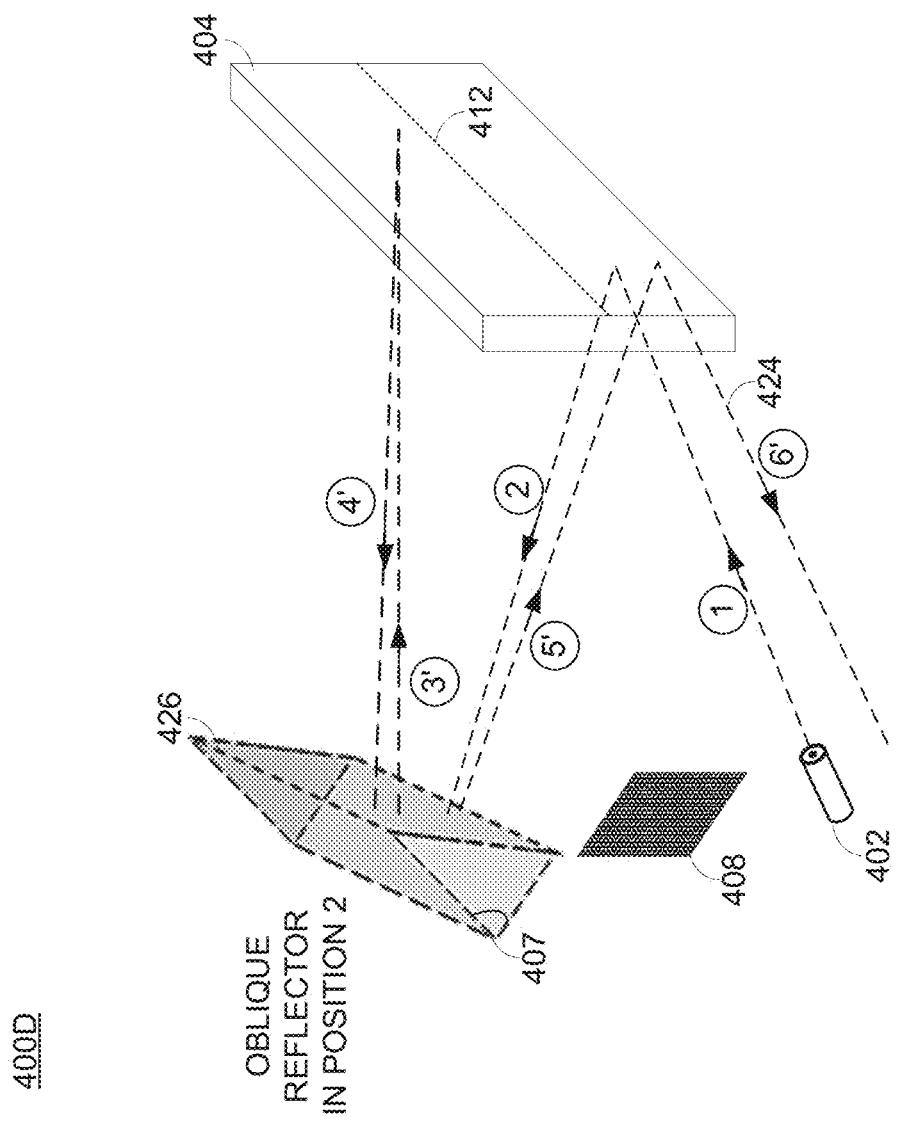

FIGS. 4C-4D illustrate paths of the main signal and the Littrow ghost in a four-pass diffraction grating-based optical pre-processing system that uses an oblique prism reflector element, according to an example. Diagram 400C shows a main signal 420 being transmitted from the input/output element 402, which is shown as a single component also acting as entrance or exit slit for simplicity purposes. The main signal 420 is diffracted by the grating 404 toward an oblique prism reflector element 426, reflected back to the grating 404, and diffracted for the second time toward a mirror 408. The main signal 420 is then reflected back to the grating 404, diffracted for the third time toward the oblique prism reflector element 426, reflected back from the oblique prism reflector element 426, and diffracted for the fourth time ("four-pass") toward the input/output element 402. Thus, the main signal 420 follows the path (1), (2), (3), (4), (5), (6), (7), (8) shown on the diagram.

Differently from the configuration shown in diagram 400A, the transmission and return paths (2, 7) and (3, 6) (as well as (4, 5) and (1, 8)) in diagram 400C are at an angle to each other due to the oblique prism reflector element 426, whereas the paths in diagram 400A are substantially parallel. In practical implementations, the oblique prism reflector element may have an apex angle 407 that may be between 1 and 3 degrees off from the right angle 405 creating an angle difference between the paths in a range from about 3 degrees to about 7 degrees. The mirror 408 may be offset in some examples to align the returning main signal 420 with the input/output element 402 (exit slit). In other examples, a focusing element at the exit slit may be used to focus the returning main signal 420.

Diagram 400D shows a path of optical signal 424 due to Littrow ghost effect in the same configuration as in FIG. 4C except for the oblique prism reflector element 426 being in a second position distinct from the first position. As with the dual-pass configuration, the main signal being diffracted from the grating 404 may create the optical signal 424 due to Littrow ghost effect, which may follow the path (1) (main signal), (2) (first diffraction), (3') (first reflection), (4') (second diffraction), (5') (second reflection), and (6') (third diffraction). It should be noted that, while the paths followed by the optical beam(s) due to Littrow ghost effect start with path 1 (input element to the grating), the remainder of the paths (2, 3', 4', 5', and 5') are distinct from the paths of the main signal (2, 3, 4, 5, 6, 7, 8). In the right-angle prism example, the return path (6') of the optical beam due to Littrow effect may happen to be colinear with the return path (8) of the main signal due to grating characteristics and prism rotation angle. In some examples, due to the oblique configuration of the prism reflector element, an angle between the transmission and return paths of the signal may be increased at each step resulting in the final return path (6') of the optical signal 424 due to Littrow ghost effect not being colinear with the main signal 420 and not overlapping with the return path (8) of the main signal at the exit slit. Thus, the interference of the Littrow ghost may be eliminated by simply modifying the prism reflector element. As with the right-angle prism reflector element, the Littrow ghost in the oblique prism reflector element may bypass the mirror 408.

While FIG. 4D shows elimination of Littrow ghost effect using an oblique prism reflector element, other ghosts (e.g., secondary ghosts) may also be eliminated using the same configuration by isolating the ghosts in a separate plane than a plane of the main signal and directing the ghost power away from the exit slit.

As mentioned herein, an apex angle of the oblique prism reflector element may be between 1 and 3 degrees off from the right angle (i.e., from about 87 degrees to about 93 degrees except 90 degrees) creating an angle difference between the paths of the returning main signal and the ghost in a range from about 3 degrees to about 7 degrees. An apex angle may also be in a wider range. The larger the apex angle, the large the prism reflector element and the grating may have to be designed to accommodate wider reflection angles. Thus, a suitable apex angle may be selected based on available room within the spectrum analyzer. For example, smaller angles may be selected for small form devices such as portable optical spectrum analyzers.

Figure 5A:
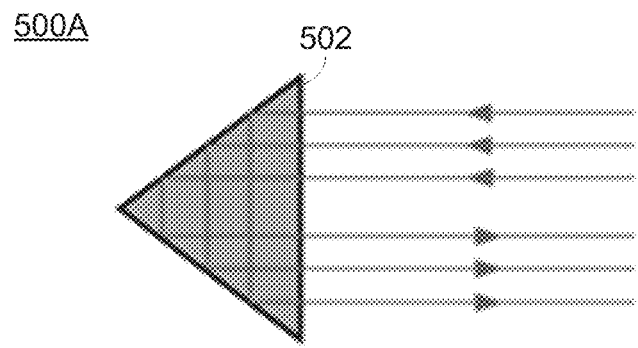
FIGS. 5A-5C illustrate various configurations for a reflector element (also known as retroflection element) in a diffraction grating-based optical spectrum analyzer, according to an example.
Figure 5B:
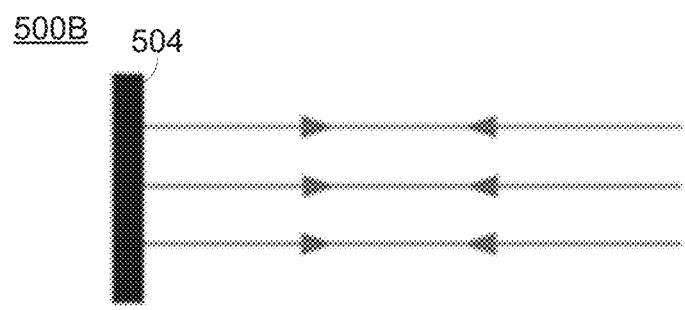
Figure 5C:
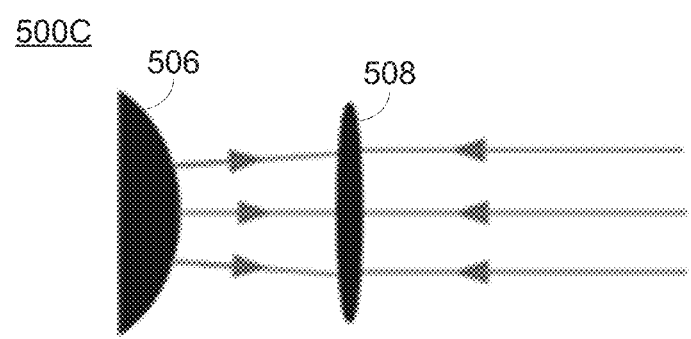

FIGS. 5A-5C illustrate various configurations 500A-500C for a reflector element (also known as retroflection element) in a diffraction grating-based optical spectrum analyzer, according to an example. For example, configurations 500A-500C may be used in a high-resolution optical spectrum analyzer, according to an example. As shown in FIG. 5A, the reflector element 502 of the first configuration 500A may be a prism reflector element. For example, an oblique prism with an apex angle that is lower or higher than 90 degrees.

As shown in FIG. 5B, the reflector element 504 of the second configuration 500B may be a flat mirror. An angle of the flat mirror reflector element may be offset to avoid the Littrow ghost from being captured by the output element by separating a return path of the main signal and a return path of the Littrow ghost. As shown in FIG. 5C, the reflector element of the third configuration 500C may include a mirror 506 and optical lens 508 combination. In some examples, the mirror 506 may be a convex mirror and the optical lens 508 may be a focusing lens. A lateral offset between the convex mirror and focusing lens of the convex mirror and the focusing lens combination may be adjustable to avoid the Littrow ghost from being captured by the output element by separating a return path of the main signal and a return path of the Littrow ghost. The offset of one of those two elements with regard to the optical axis may provide a similar effect as the oblique angle prism (diagram 500A) and the tilted mirror (diagram 500B).

Although the examples described herein are directed to these various reflector element configurations 500A-500C, it should be appreciated that other reflector element or retroreflective element configurations, or combinations of such configurations, may also be provided.

While specific configurations such as the arrangements of a number of components (e.g., diffraction grating, reflector element, etc.) are shown in conjunction with the monochromator systems herein, the illustrated configurations are not intended to be limiting. A modified reflector element-based diffraction grating monochromator may be implemented with other configurations and component values using the principles described herein.

Figure 6:
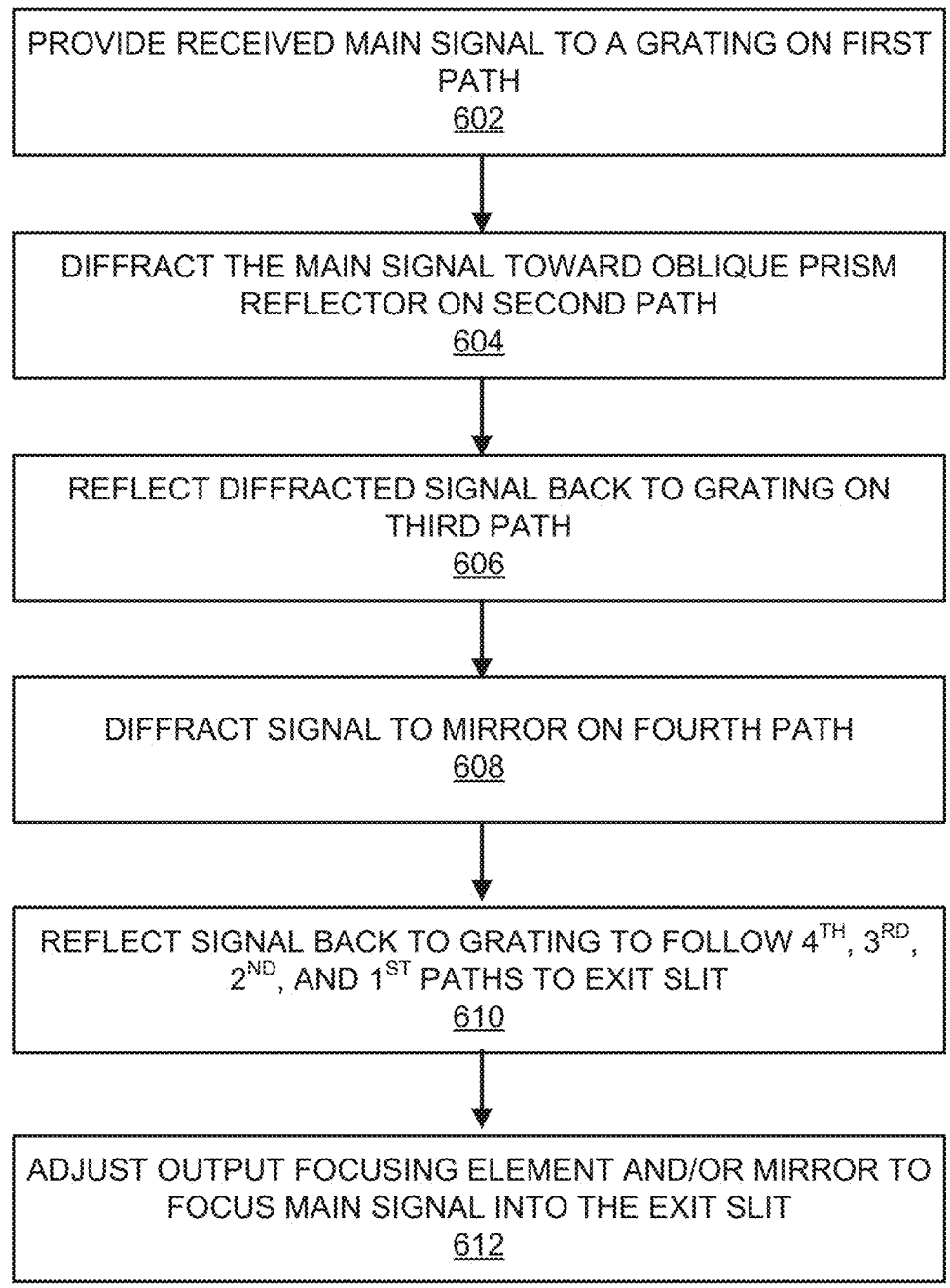
FIG. 6 illustrates a flow chart of a method for eliminating optical ghosts in an optical spectrum analyzer through a modified reflector element such as an oblique prism reflector element, according to an example.

FIG. 6 illustrates a flow chart of a method for eliminating optical ghosts in an optical spectrum analyzer through a modified reflector element such as an oblique prism reflector element, according to an example. The method 600 is provided by way of example, as there may be a variety of ways to carry out the method described herein. Although the method 600 is primarily described as being performed by the configurations of FIGS. 4A-4D, the method 600 may be executed or otherwise performed by one or more processing components of another system or a combination of systems. Each block shown in FIG. 6 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 602, a monochromator based optical spectrum analyzer (e.g., optical measurement system 100) may receive a main signal 410 to be measured, which may be provided onto a grating 404 along a first path. A first diffracted main signal may be provided to an oblique prism reflector element 406 along a second path at block 604. The oblique prism reflector element 406 may have an apex angle in a range from about 87 degrees to about 93 degrees in some implementation examples, but the apex angle is not limited to the example implementations.

At block 606, the first diffracted main signal may be reflected back to the grating 404 on a third path that is slightly angled compared to the second path. At block 608, the signal may be diffracted for the second time at the grating 404 and provided to a mirror 408 along a fourth path.

At block 610, the mirror may reflect the signal back to the grating 404 along the fourth path, where the signal may be diffracted for a third time and sent back to the oblique prism reflector element 406 along the third path. The oblique prism reflector element 406 may reflect the signal back to the grating 404 along the second path, where the signal may be diffracted for the fourth time and sent to an exit slit along the first path (colinear with the original main signal). The oblique nature of the prism may allow any Littrow or secondary ghost to be sent back at an angle (not colinear) with the outgoing signal. Thus, the ghost optical beam may not be captured by the exit slit.

At optional block 612, a focusing element at the exit slit may be adjusted to focus the outgoing main signal into the exit slit. In other examples, the mirror 408 may also be offset to adjust a path of the main signal in view of the apex angle of the oblique prism reflector element.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
 a grating element to diffract an input optical beam;
 a reflector element to reflect the diffracted optical beam, wherein the reflector element comprises a rotatable oblique prism with an apex angle that is different from a right angle; and
 a mirror to reflect the reflected diffracted optical beam back to the reflector element and the grating element, wherein an output optical beam from the grating element is provided via an output element to a detection element for high resolution optical measurement.

2. The system of claim 1, wherein the reflector element reduces or eliminates a Littrow ghost effect caused by the grating element.

3. The system of claim 2, wherein the apex angle of the reflector element causes a return path of optical beams that cause the Littrow ghost effect to the output element to be non-colinear with a path of the output optical beam.

4. The system of claim 2, wherein the apex angle of the reflector element causes a return path of optical beams that cause the Littrow ghost effect to the output element to be on a first plane distinct from a second plane of a path of the output optical beam.

5. The system of claim 1, wherein the input optical beam is diffracted four times by the grating element prior to being provided to the output element as the output optical beam.

6. The system of claim 1, wherein the reflector element reduces or eliminates a secondary ghost beam created by the grating element.

7. The system of claim 1, wherein the mirror is offset to align the output optical beam with the output element.

8. The system of claim 1, further comprising a focus element to focus the output optical beam to the output element.

9. The system of claim 1, wherein the apex angle is in a range between about 1 degree and about 3 degrees above and below the right angle.

10. The system of claim 1, wherein the output element is an exit slit.

11. The system of claim 1, wherein the grating element comprises one of a transmission amplitude diffraction grating, a reflection amplitude diffraction grating, a phase diffraction grating, or an optical axis diffraction grating.

12. A method for an optical spectrum analyzer, comprising:
   receiving, at a grating element, an optical beam on a first path from an input element to be diffracted by the grating element;
   transmitting, by the grating element, the optical beam on a second path to a reflector element, wherein the reflector element is a rotatable oblique prism reflector element in a first position and has an apex angle that is different from a right angle;
   reflecting, by the reflector element, the optical beam on a third path back to the grating element to be diffracted by the grating element;
   transmitting, by the grating element, the optical beam on a fourth path to a mirror;
   reflecting, by the mirror, the optical beam on a fifth path back to the grating element to be diffracted by the grating element;
   transmitting, by the grating element, the optical beam on a sixth path to the reflector element;
   reflecting, by the reflector element, the optical beam on a seventh path back to the grating element to be diffracted by the grating element; and
   transmitting, by the grating element, the optical beam on an eighth path as an output optical beam to an output element.

13. The method of claim 12, wherein the apex angle of the reflector element causes a return path of optical beams that result in a Littrow ghost effect to the output element to be non-colinear with the eighth.

14. The method of claim 12, wherein the apex angle of the reflector element causes a return path of optical beams that result in a Littrow ghost effect to the output element to be on a first plane distinct from a second plane of the eighth path of the output optical beam.

15. The method of claim 12, further comprising:
   offsetting the mirror to align the output optical beam with the eighth path.

16. The method of claim 12, further comprising:
   focusing the output optical beam to the output element by a focus element.

17. The method of claim 12, wherein the apex angle is in a range between about 1 degree and about 3 degrees above and below the right angle.

18. An optical spectrum analyzer (OSA), comprising:
   an optical pre-processing block comprising:
      a grating element to diffract an optical beam;
      a reflector element to reflect the optical beam, the reflector element comprising at least one of an oblique prism reflector element, wherein an apex angle of the oblique prism reflector element is different from a right angle; and
      a mirror to reflect the optical beam back to the reflector element and the grating element, wherein an output optical beam from the grating element is provided via an output element to a detection element of the OSA for high resolution optical measurement.

19. The optical spectrum analyzer (OSA) of claim 18, wherein
   the reflector element is the flat mirror, and an angle of the flat mirror reflector element is offset to reduce or eliminate a Littrow ghost effect caused by the grating element; or
   the reflector element is the combination of the convex mirror and the focusing lens, and a lateral offset of one or more of the convex mirror and the focusing lens are adjustable to reduce or eliminate the Littrow ghost effect created by the grating element.

* * * * *